(12) United States Patent
Zhang et al.

(10) Patent No.: US 10,497,122 B2
(45) Date of Patent: Dec. 3, 2019

(54) IMAGE CROP SUGGESTION AND EVALUATION USING DEEP-LEARNING

(71) Applicant: Adobe Inc., San Jose, CA (US)

(72) Inventors: Jianming Zhang, Boston, MA (US); Zijun Wei, Stoneybook, NY (US); Zhe Lin, Fremont, CA (US); Xiaohui Shen, San Jose, CA (US); Radomir Mech, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/730,564

(22) Filed: Oct. 11, 2017

(65) Prior Publication Data

US 2019/0108640 A1    Apr. 11, 2019

(51) Int. Cl.
*G06T 7/11* (2017.01)
*G06T 7/73* (2017.01)
*G06N 3/08* (2006.01)
*G06T 3/40* (2006.01)

(52) U.S. Cl.
CPC ............. *G06T 7/11* (2017.01); *G06N 3/088* (2013.01); *G06T 3/40* (2013.01); *G06T 7/73* (2017.01); *G06T 2207/20084* (2013.01); *G06T 2207/20132* (2013.01)

(58) Field of Classification Search
CPC .... H04N 1/3872; H04N 1/3875; H04N 1/387; G06T 5/001; G06T 11/60; G06T 3/0012; G06T 1/0078; G06K 9/3233; G06F 3/0484; G06F 3/04842
See application file for complete search history.

(56) References Cited

U.S. PATENT DOCUMENTS

| | | |
|---|---|---|
| 8,547,469 B2 | 10/2013 | Ejima |
| 9,325,899 B1 | 4/2016 | Chou |
| 9,836,484 B1 | 12/2017 | Birula-Bialynicka |
| 1,007,565 A1 | 9/2018 | Jeong |
| 1,008,337 A1 | 9/2018 | Chakraborty |
| 2006/0171703 A1 | 8/2006 | Abe |
| 2007/0140675 A1 | 6/2007 | Yanagi |
| 2007/0146528 A1 | 6/2007 | Yanagi |
| 2007/0291154 A1 | 12/2007 | Moon |
| 2008/0052945 A1 | 3/2008 | Matas |

(Continued)

OTHER PUBLICATIONS

Chen,Yi-Ling, et al., "Learning to Compose With Professional Photographs on the Web", arXiv preprint arXiv:1702.00503, Feb. 2017, 10 pages.

(Continued)

*Primary Examiner* — Duy M Dang
(74) *Attorney, Agent, or Firm* — Kilpatrick Townsend & Stockton LLP

(57) ABSTRACT

Various embodiments describe using a neural network to evaluate image crops in substantially real-time. In an example, a computer system performs unsupervised training of a first neural network based on unannotated image crops, followed by a supervised training of the first neural network based on annotated image crops. Once this first neural network is trained, the computer system inputs image crops generated from images to this trained network and receives composition scores therefrom. The computer system performs supervised training of a second neural network based on the images and the composition scores.

20 Claims, 9 Drawing Sheets

(56) References Cited

U.S. PATENT DOCUMENTS

| | | |
|---|---|---|
| 2008/0068487 A1 | 3/2008 | Morita |
| 2008/0192129 A1 | 8/2008 | Walker |
| 2008/0240563 A1 | 10/2008 | Takano |
| 2014/0184848 A1 | 7/2014 | Shimosato |
| 2014/0204244 A1 | 7/2014 | Choi |
| 2014/0351264 A1 | 11/2014 | Murray |
| 2015/0084951 A1 | 3/2015 | Boivin |
| 2015/0170405 A1 | 6/2015 | Hu |
| 2015/0213612 A1* | 7/2015 | Lin ............... G06F 16/5838 382/173 |
| 2016/0073034 A1 | 3/2016 | Mukherjee |
| 2016/0080643 A1 | 3/2016 | Kimura |
| 2016/0104055 A1* | 4/2016 | Lin ............... G06T 3/0012 382/298 |
| 2017/0118401 A1 | 4/2017 | Yim |
| 2017/0118413 A1 | 4/2017 | Shin |
| 2017/0132526 A1 | 5/2017 | Cohen |
| 2017/0178289 A1 | 6/2017 | Zhang |
| 2017/0178291 A1* | 6/2017 | Lin ............... G06T 3/0012 382/173 |
| 2017/0257576 A1 | 9/2017 | Mitsui |
| 2017/0278546 A1 | 9/2017 | Xiao |
| 2017/0294010 A1 | 10/2017 | Shen |
| 2018/0032031 A1 | 2/2018 | Du |
| 2018/0357501 A1 | 12/2018 | Ma |

OTHER PUBLICATIONS

Cheng, Bin, et al., "Learning to Photograph" In Proceedings of the 18th ACM international conference on Multimedia, pp. 291-300. ACM, 2010, 10 pages.

Erhan, Dumitru, et al., "Scalable Object Detection Using Deep Neural Networks", In Proceedings of the IEEE Conference on Computer Vision and Pattern Recognition, 2014, 8 pages.

Girshick, Ross, et al., "Fast r-cnn", In Proceedings of the IEEE International Conference on Computer Vision, 2015, 9 pages.

He, Kaiming, et al., "Spatial Pyramid Pooling in Deep Convolutional Networks for Visual Recognition", In European Conference on Computer Vision, Springer, 2014, arXiv:1406.4729v4, Apr. 23, 2015, 14 pages.

Kang, Le, et al., "Convolutional Neural Networks for No-Reference Image Quality Assessment", In Proceedings of the IEEE Conference on Computer Vision and Pattern Recognition, 2014, 8 pages.

Kong, Shu, et al., "Photo Aesthetics Ranking Network With Attributes and Content Adaptation", In European Conference on Computer Vision, Springer, 2016, arXiv:1606.01621v2, Jul. 27, 2016, 24 pages.

Liu, Ligang, et al. "Optimizing Photo Composition", In Computer Graphics Forum, vol. 29, Issue 2, Wiley Online Library, Computer Graphics Forum 2010, 12 pages.

Lu, Xin, et al., Rapid: Rating Pictorial Aesthetics Using Deep Learning, In Proceedings of the 22nd ACM international conference on Multimedia, ACM, 2014, 10 pages.

Lu, Xin, et al., "Deep Multi-Patch Aggregation Network for Image Style, Aesthetics, and Quality Estimation", In Proceedings of the IEEE International Conference on Computer Vision, 2015, 9 pages.

Park, Jaesik, et al., "Modeling Photo Composition and its Application to Photo Rearrangement" In Image Processing (ICIP), 2012 19th IEEE International Conference, IEEE, 2012, 4 pages.

Szegedy, Christian, et al., "Going Deeper with Convolutions", In Proceedings of the IEEE Conference on Computer Vision and Pattern Recognition, 2015, 9 pages.

Yan, Jianzhou, et al, "Learning the Change for Automatic Image Cropping", In Proceedings of the IEEE Conference on Computer Vision and Pattern Recognition, 2013, 8 pages.

Zhang, Minghu, et al., "Auto Cropping for Digital Photographs", In Multimedia and Expo, 2005, ICME 2005, IEEE International Conference, IEEE, 2005, 4 pages.

Ma, Shuang, et al., "Pose maker: A pose recommendation system for person in the landscape photographing", In Proceedings of the 22nd ACM international conference on Multimedia, ACM, 2014, 4 pages.

Xu, Yan, et al., "Real-Time Guidance Camera Interface to Enhance Photo Aesthetic Quality", In Proceedings of the 33rd Annual ACM Conference on Human Factors in Computing Systems, ACM, 2015.

Yao, Lei, et al, "Oscar: On-Site Composition and Aesthetics Feedback Through Exemplars for Photographers", International Journal of Computer Vision, 96(3), 2012.

* cited by examiner

IMAGE CROP SUGGESTION AND EVALUATION USING DEEP-LEARNING

TECHNICAL FIELD

The application generally relates to using a neural network to evaluate image crops in substantially real-time. The neural network can interface or be implemented with an image application to provide scores and recommendations about image crops.

BACKGROUND

Users commonly operate computing devices equipped with cameras to take images. Image applications hosted on such or other computing devices are available and provide many image editing operations. Cropping an image is among such operations and allows removing or extending a portion of the image to change its aspect ratio, improve framing, or accentuate particular subject matter.

When an image is cropped, its composition changes. The composition refers to the way various elements of the subject matter are arranged within the image, where the arrangement can reflect an aesthetic quality of the subject matter as it appears in the image. Composition guidance refers to the process of identifying how to perform better image crops that have good compositions.

For example, an image is captured and shows a tennis player serving a ball while on a tennis court. The image can be cropped to focus on the tennis player only. However, if the cropping is extensive and removes the player's racket or face, the resulting image would have an unacceptable composition.

Some existing systems allow automatic cropping, where the image application, instead of the user, generates or recommends image crops. However, the accuracy, efficiency, and speed associated with the processing to perform crop operations can be improved. More specifically, such systems generally adopt one of two approaches: rule-based and learning-based approaches.

Rule-based approaches encode rules in score functions to evaluate the composition of an image crop. These approaches rely on users manually designing the rules. However, designing rules for all types of images is very challenging, and the rule-based approaches often fail for images on which the rules do not apply. For example, many rule-based approaches rely on human face detection, but cannot work robustly for images of animals.

Learning-based approaches try to automatically learn composition rules or score functions from a training set. These methods rely on neural network and avoid the difficulty of manually designing the composition rules. However, these approaches also face multiple challenges. For example, the complexity of the neural networks can prohibit high quality crop suggestion or generation in real-time and/or the generation of a diverse set of image crops with good compositions. Specifically, existing learning-based approaches only target generating a single crop for a test image. In comparison, in a real world image application, the user may need multiple image crop suggestions of different aspect ratios and scales. Further, the quality of the image crops depend on the training. Existing learning-based approaches rely on supervised training that involves user-based annotations and that trains a neural network to learn and recognize specific features. Hence, the amount of user-based annotations and of the learned features can significantly limit high quality and diverse crop suggestion or generation.

SUMMARY

Embodiments of the present disclosure describe using a neural network to evaluate image crops in substantially real-time. In an example, the deep-learning system includes a first neural network and a second neural network. The first neural network is associated with generating a composition score of an image crop within an image. In comparison, the second neural network is associated with evaluating compositions of predefined crop areas within the image. A computer system performs unsupervised training of the first neural network based on unannotated image crops. The unsupervised training includes updating parameters of the first neural network. The computer system also performs, upon completion of the unsupervised training, first supervised training of the first neural network based on annotated image crops. The first supervised training further updates the parameters of the first neural network. The computer system generates image crops from images based on predefined crop areas. The computer system also receives, from the first neural network, composition scores of the image crops based on inputting the image crops to the first neural network upon completion of the first supervised training. The computer system performs second supervised training of the second neural network based on the images and the composition scores. The second supervised training comprising updating parameters of the second neural network. The computer system also provides, to an image application, information about a composition of the image crop within the image based on at least one of: an output from the first neural network or an output from the second neural network.

The unsupervised training of the first neural network allows the deep-learning system to learn features across a very large number of images, in the millions, covering a very diverse set of subject matter (e.g., people, animals, nature, urban areas, industrial scenes, etc.). The first supervised training uses a limited number of annotated images that were generated based on user input. This supervised training allows the fine tuning of the first neural network. Once training, the first neural network can be used as a teacher that trains the second neural network. Specifically, a large number of training images and an even larger number of image crops can be scored by the first neural network and automatically annotated given the computed composition scores. In this way, the supervised training of the second neural network allows this network to accurately assess the compositional quality of image crops. Further, the architecture of the deep-learning network allows the use of one or both of these networks when trained, such that the desired image composition can be returned to an image application in an accurate, efficient, and fast way.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
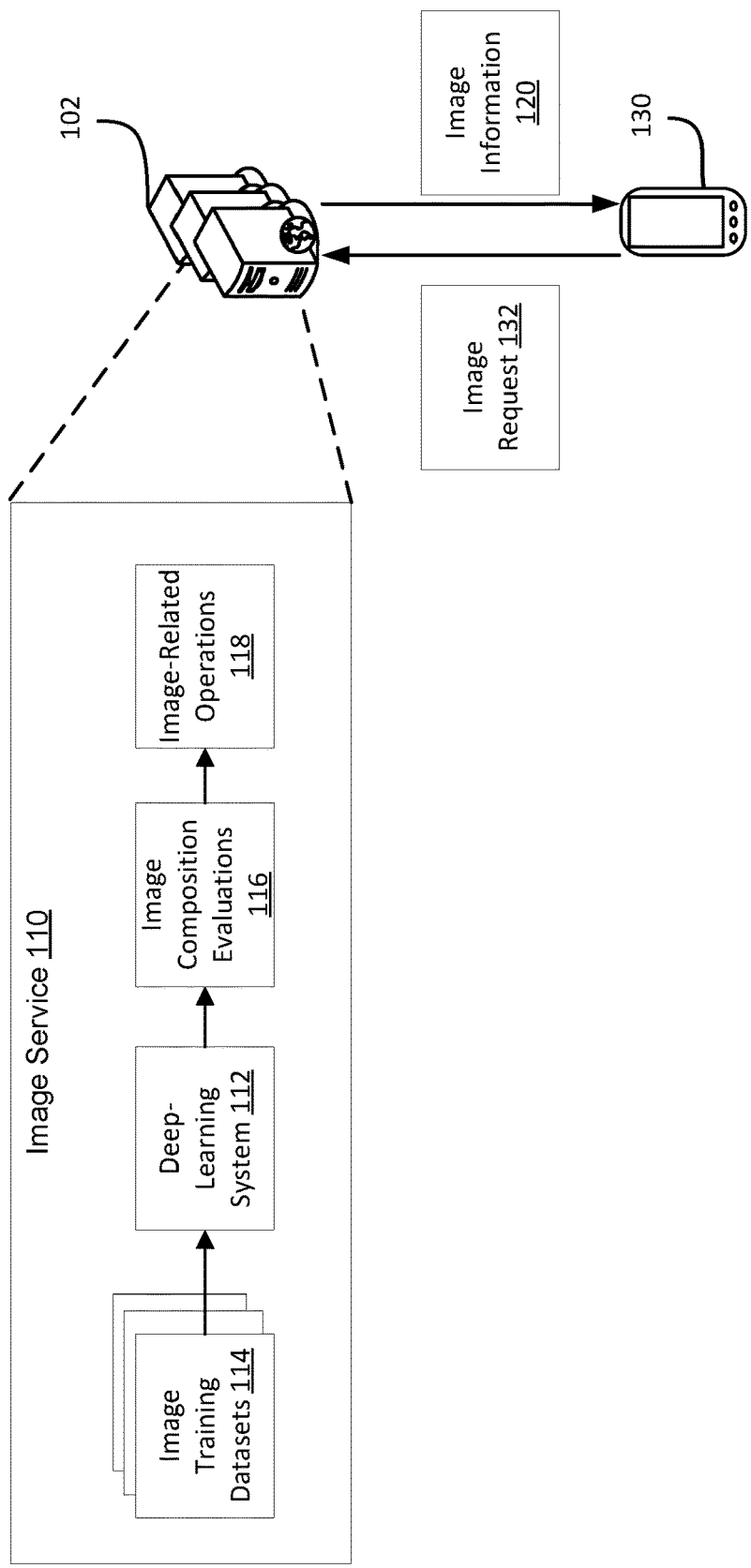
FIG. 1 illustrates an example of a client-server architecture for providing an image service, according to embodiments of the present disclosure.

Embodiments of the present disclosure are directed to, among other things, a deep-learning based system for high quality, diverse, and fast crop suggestion and generation. The deep-learning based system learns the relevant features to evaluate the composition of an image crop. Unsupervised training and supervised training are used to update the parameters of the system. The use of both types of training enables assessing the compositional quality at a high accuracy for a very diverse subject matter. The architecture of the system also enables the assessment to be performed in substantially real-time, such as within less than 0.5 seconds between the time an image is received and multiple image crops having a high compositional quality are identified and recommended.

In an example, the deep-learning based system includes two deep-learning sub-networks. The first one is a neural network that takes a crop of an image as input and outputs a composition score indicating the compositional quality of the crop. This sub-network is referred to herein as an evaluation network. The second one is another neural network that takes the whole image as input and outputs a ranked list of image crops, each of which is associated with a respective composition score. This sub-network is referred to herein as a proposal network. The two neural networks can be used in combination for a fast, efficient, and accurate evaluation of the composition of an image and proposal of crops from the image, where each image crop has a high compositional quality.

The use of the two networks can be extended to various types of image applications and services. For example, the deep-learning based system is usable for real-time guided composition on mobile devices. This system can also be used to crop three-hundred sixty degree immersive videos for preview, or to guide other autonomous agents like drones or robots to take images having a high compositional quality.

Existing learning approaches to image cropping can be limited due to the use of supervised training and the need for annotated images specific to particular subject matter. The embodiments of the present disclosure resolve such constraints. Generally, the evaluation network needs less training data, while the proposal network needs densely annotated training data which is expensive to collect. Accordingly, the evaluation network is trained first, and then used as a teacher of the proposal network. This involves using the evaluation network to automatically generate densely annotated data to train the proposal network.

To train the evaluation network, unsupervised training is used first. In an example, millions of unannotated images covering diverse subject matter are input to the evaluation network. This number of images is easy to collect because no annotation is needed. Next, supervised training is used to fine tune the parameters of the evaluation network. This training stage uses a much lower number of images (e.g., in the range of one thousand to two thousand images). These images can be manually annotated by a set of expert users. The fine tuning increases the robustness of the evaluation network to learn the relevant features and accurately evaluate the compositional quality for a diverse set of subject matter.

Once the evaluation network is trained, the training of the proposal network commences. Here, supervised training is used. However, instead of requiring user-based manual annotations of image crops, annotations are generated by the evaluation network for the supervised training of the proposal network. For example, image crops are input to the evaluation network that, in turn, outputs information about the evaluation of the respective compositions (e.g., composition scores). This information is used as the annotations of the image crops. The image crops and the annotations are input to the proposal network in this training stage.

Once both networks are trained, various image applications and services can be supported in real-time. On one hand, if evaluating the composition of an image captured by a user (or a drone) is needed, the evaluation network is invoked by inputting the image thereto. In response, a score indicating the compositional quality is received. The time between the input to and output from the evaluation network can be significantly short such that, from a user perspective, the evaluation of the image composition would appear to be performed in real-time. For example, this time can be less than 0.5 seconds. On the other hand, if a recommendation for an image crop out of the captured image is needed, the proposal network can be invoked by also inputting the image thereto. In response, the best available image crops are identified and recommended (e.g., the top ten having the highest composition scores). Here, the time between the input to and output from the proposal network can be even much shorter. Generally, the proposal network can be an order of magnitude faster than the evaluation network. Of course, both networks can be used together, in parallel or sequentially.

FIG. 1 illustrates an example of a client-server architecture for providing an image service 110, according to embodiments of the present disclosure. A server 102 hosts the image service 110. A client 130 communicates with the server 102 over a data network to access functionalities of the image service 110. The data network includes a public data network, such as the Internet, and/or a private data network, such as an intranet. Example functionalities of the image service 110 include assessing compositions of images and image crops, and/or other functionalities related to images (e.g., uploading, searching, and downloading images and image crops).

In an example of using the image service 110, the client 130 sends an image request 132 to the server 102. The image request 132 can include an image captured by camera of the client 130 and can request an evaluation of the composition of the image and/or a recommendation for an image crop from the image. The server 102 inputs the image to the image service 110 based on the request, receives back image information 120, and responds to the client 130 with the image information 120. The image information 120 can include a composition score for the image, indicating the compositional quality of the image. The image information can also or alternatively include a number of image crops from the image with their composition scores or their ranking based on their composition qualities (e.g., the top ten image crops having the highest composition scores).

In an example, the server 102 represents a suitable computing system for hosting the image service 110. The computing system can be implemented on physical resources, such as collection of servers or a server farm or within a cloud-based computing service. The client 130 represents a suitable end user device such as a mobile device, a desktop, or other computing devices capable of communication with the server 102 over a data network. In an example, the image service 110 represents an image service application. For instance, the image service 110 implements a number of modules to maintain a collection of images and image crops and enable operations on such images and image crops. Each module can be implemented in hardware, software hosted on hardware, or a combination of hardware and software. A deep-learning system 112 is an example of such modules.

Generally, the deep-learning system 112 is configured to evaluate image compositions. In an example, the configuration implements two convolutional neural networks: an evaluation network that evaluates the composition of a whole image and a proposal network that evaluates the individual compositions of crop areas within the image. The architectures of the deep-learning system and each of the two sub-networks are further illustrated in the next figures.

As illustrated in FIG. 1, the deep-learning system 112 is trained using multiple image training datasets 114. One of the image training datasets 114 includes unannotated images, in the millions, used for the initial unsupervised training of the evaluation network. Another one of the image training datasets 114 includes an annotated image, in the thousands, used for the subsequent supervised training of the evaluation network such that the parameters of this network are fine-tuned after the completion of the unsupervised training. Yet another one of the image training datasets 114 includes annotated images, in the millions, used for the supervised training of the proposal network. Such images are annotated to indicate the composition scores of image crops within each image. These scores are generated by the evaluation network.

Once trained, the deep-learning system 112 analyzes the image received from the client 130 (or any number of images such as ones published from various online sources and/or generated locally to the image service 110, periodically or at time intervals) to generate image composition evaluations 116. The analysis includes evaluating the composition of the image and/or recommending image crops from the image. Various image-related operations 118 can be provided based on the image composition evaluations 116. For example, an indication of the compositional quality of the image can be returned to the client 130. In another example, a recommendation for a particular image crop can be returned.

Relevant to evaluating the composition of the image, the image is input to the evaluation network. A composition score is an output from the evaluation network. The composition score indicates the compositional quality of the image and is generated based on features learned from the image by various layers of the evaluation network as further described in connection with the next figures. Learning these features depends on the parameters of the evaluation network, where such parameters were updated and set during the unsupervised and supervised training.

Relevant to recommending image crops, the image is input to the proposal network. The proposal network is configured to assess crops from the image, where each crop corresponds to a predefined crop area. Each crop area can be defined by using a bounding box that covers a specific location within the image. The proposal network generates a composition score for each image crop. Further, the image crops can be ranked given the composition scores and a predefined number of the image crops can be recommended (e.g., the top ten). A composition score is generated for an image crop based on features learned globally from the image and locally from the image crop by various layers of the proposal network. Learning these features depends on the parameters of the proposal network, where such parameters were updated and set during the supervised training.

To illustrate, consider an example of an image captured by the client 130, where the subject matter is a tennis player serving a ball. The image shows the player and the entire player side of the tennis court. The image service 110 may indicate that this image has a relatively good composition score given that the player, the racket, the ball, and the portion of the tennis court are shown. The image service 110 may also recommend a crop that removes a large portion of the player side of the tennis court such that the player, racket, and ball are accentuated. The recommendation is based on this image crop also having a relatively good composition score.

Although FIG. 1 describes a client-server architecture, the embodiments of the present disclosure are not limited as such. Instead, the embodiments similarly apply to other computing architectures. For example, the training of the deep-learning system 112 and updates thereto can be hosted on the server 102. Once trained, the server 102 sends the deep-learning system 112 to the client 130. Similarly, the server 102 sends the relevant updates to the client 130 via a push or pull mechanism. In this way, the client 130 hosts the deep-learning system 112 and the image composition evaluations 116 and image-related operations can be performed locally on the client 130.

Figure 2:
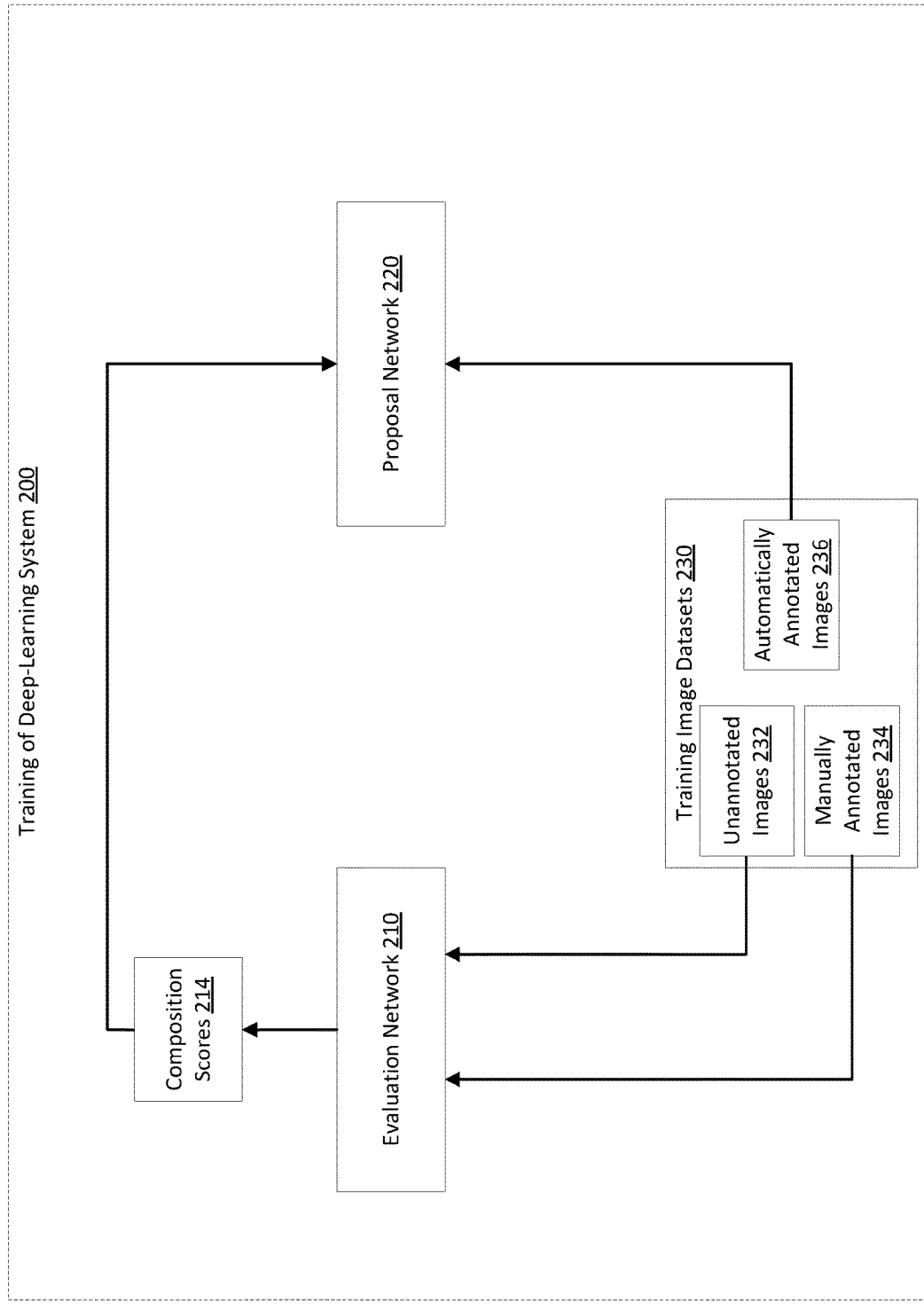
FIG. 2 illustrates an example of training of a deep-learning system, according to embodiments of the present disclosure.

FIG. 2 illustrates an example of training 200 of a deep-learning system, according to embodiments of the present disclosure. The deep-learning system can represent, for instance, the deep-learning system 112 of FIG. 1. As illustrated, the deep-learning system includes an evaluation network 210 and the proposal network 220. The training uses training image datasets 230 that includes unannotated images 232, manually annotated images 234, and automatically annotated images 236. In an example, the training involves training the evaluation network 210 and then using the trained evaluation network 210 to train the proposal network 220. The evaluation network 210 is trained in an unsupervised mode first given the unannotated images 232 and, subsequently, in a supervised mode given the manually annotated images 234. Once trained, the evaluation network 210 is used to generate information about compositional quality of image crops within images. Such images and information are stored as the automatically annotated images 236 in the training image datasets 230. The proposal network 220 is trained in a supervised mode given the automatically annotated images 236.

The training of each of the evaluation network 210 and proposal network 220 is further described in connection with the next figures. Herein next, the description of the information generated by evaluation network 210 for the training of the proposal network 220 is provided.

In an example, the training image datasets 230 includes a large number of training images (not shown), none of which needs to be annotated manually by a user. The deep-learning system generates, from each of the training images, a number of image crops, such as eight-hundred ninety-five image crops as an example. Each of the image crops corresponds to a crop area defined by a bounding box to cover a predefined location within an image. In the example of eight-hundred ninety-five image crops, eight-hundred ninety-five bounding boxes are predefined as an over-complete set that exhaustively covers the possible locations of image crops within the image with high compositional qualities. The predefined bounding boxes are densely overlapped over different scales and aspect ratios. Of course, the bounding boxes including their shapes, sizes, and number can be customized based on the underlying image application (e.g., the applications supported by the image service 110 of FIG. 1).

The deep-learning system inputs the image crops to the evaluation network 210 (which is already trained). In turn, the evaluation network outputs composition scores 214. Each of the composition scores 214 corresponds to one of the image crops and indicates the compositional quality of that image crop. The deep-learning system generates annotations about the image crops based on the composition scores 214. For example, each image crop is annotated with the corresponding composition score. In another example, the image crops generated from the same training image are ranked based on their respective composition scores, and their absolute rankings (e.g., the best image crop, the worst image crop) or relative rankings (e.g., this image crop has a better image crop than this other image crop) are stored as the annotations. The training images and the annotation of each image crop (or, similarly, the annotation of each bounding box in a training image) form the automatically annotated images 236. The deep-learning system inputs the automatically annotated images 236 to the proposal network 220 to train this network.

Figure 3:
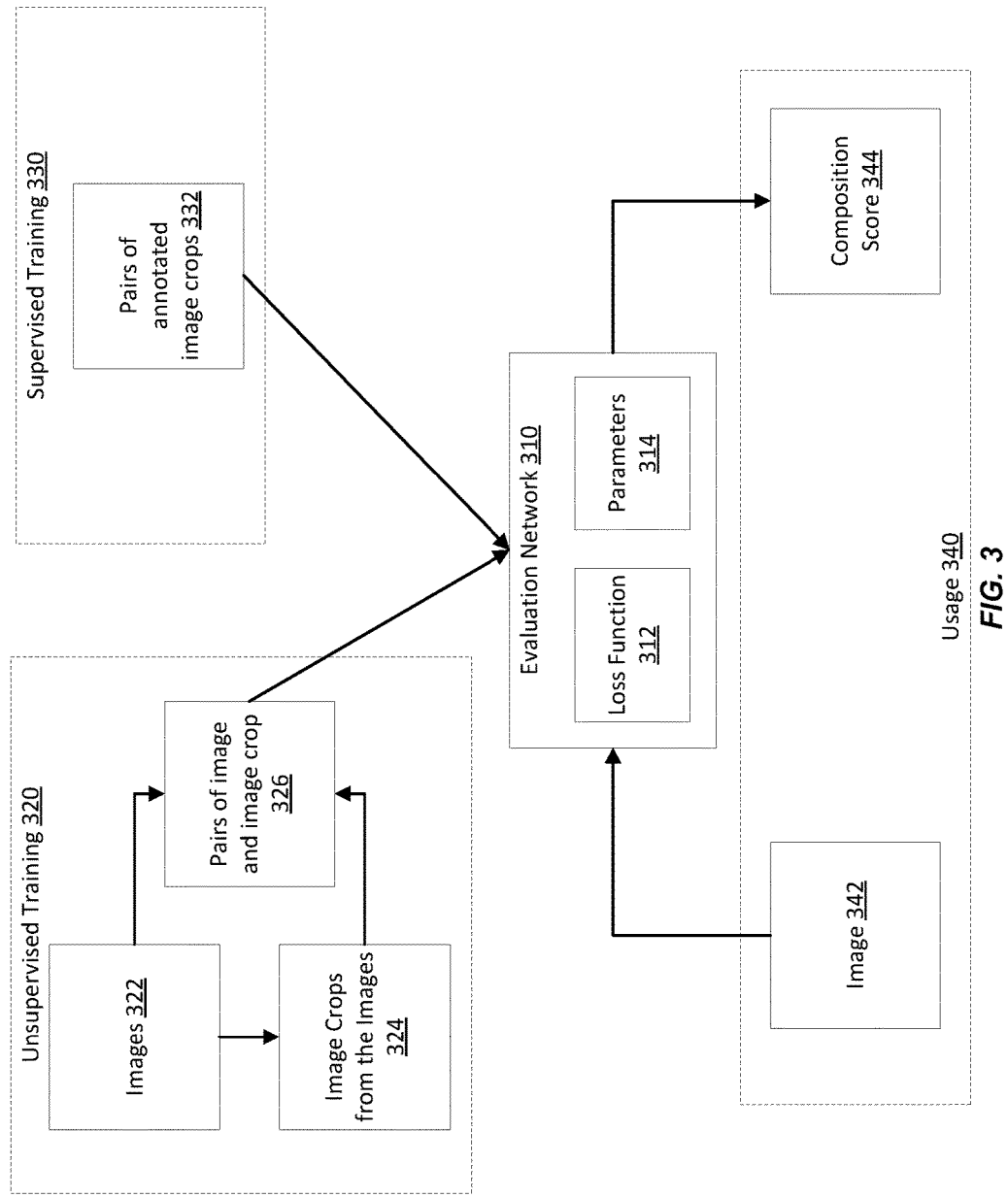
FIG. 3 illustrates an example of training and using an evaluation network of a deep-learning system, according to embodiments of the present disclosure.

FIG. 3 illustrates an example of training and using an evaluation network 310 of a deep-learning system, according to embodiments of the present disclosure. As illustrated, the training includes unsupervised training 320 and supervised training 330. Usage 340 of the trained evaluation network 310 includes inputting an image 342 thereto and outputting a composition score 344 therefrom.

Although FIG. 3 illustrates the input as being the image 342, this input can be instead an image crop from the image 342. In this case, the composition score 344 indicates the compositional quality of the image crop instead of the image 342. Whether to input an image or an image crop depends on the underlying image application. For example, to train a proposal network, the input are image crops. To evaluate an image captured by a client, the input is the input.

In an example, the evaluation network 310 includes a convolutional neural network. For instance, the evaluation network can be implemented by using the GoogLeNet architecture with the last fully connected layer removed and augmented with a spatial pyramid pooling. Generally, the GoogLeNet architecture includes a convolutional neural network having multiple microstructures, where each microstructure can represent a layer with multiple branches. Each layer can replace a neuron in a traditional convolutional network. The outputs of the branches of one layer can be combined. Spatial pyramid pooling collapses (e.g., by concatenating averages of) the feature vectors that are output from the different layers to generate a feature map.

Generally, the unsupervised training 320 is performed prior to the supervised training 330. Nonetheless, both types of training use the same loss function 312 to update the same parameters 314 of the evaluation network 310. The loss function 312 is described herein next. The parameters 314 correspond to the different layers of the evaluation network 310 and are used to generate the feature maps.

The unsupervised training 320 relies on images 322, image crops 324 from the images 324 and pairs 326 of image and image crop. The images 322 represent a large number of unannotated images, in the millions, covering diverse subject matter (e.g., people, animals, nature, urban areas, industrial scenes, etc.). Each of the image crops 324 is generated from one of the images 324, such that the image and the image crop form one of the pairs 326.

Various techniques are available to generate the image crops 324 and, equivalently, the pairs 326 based on the images 322. In one example, an image crop is generated randomly by applying a random bounding box to an image. In this case, the image is presumed to have a better compositional quality than the derived image crop. The pair formed by the image and the image crop indicates (based on the order of the two elements in the pair, or based on automatically generated annotations) that the image has a better compositional quality than the image crop.

In another example, a more involved approach is used, where an image crop can be presumed to have a relatively better compositional quality depending on the scale of the cropping. Large crops can be presumed to have a better compositional quality that the original images. Conversely, medium or small crops can be presumed to have a relatively worse compositional quality. Scaling ranges can be predefined and mapped to large, medium, and small sizes.

For instance, an image is added as one element to a pair. A large crop (e.g., 0.95 of the original size of the image) is generated from the image. The large crop is added as the remaining element of the pair. Similarly, the large crop with a uniform small oscillation (e.g., 0.05 of the original size of the image) is added as the remaining element to another pair that contains the image. In such pairs, the image crops (e.g., the large crop, and the large crop with the uniform small oscillation) are presumed to have a better compositional quality than the image. In this method, a medium image crop and a small image crop can also be generated. The medium image crop is generated by placing a uniformly scaled window (e.g., 0.75 of the original image size). The small image crop is generated by using random scaled offsets to the image (e.g., less than 0.5 of the original size). Each of the medium and small image crops can be added as elements to respective pairs that contain the image. In these pairs, the medium and small image crops are presumed to have a worse compositional quality than the image.

Regardless of the technique used to generate the image crops 324 from the images 322, each of the resulting pairs 326 includes two elements: an image and an image crop. The organization of the elements in the pair (e.g., the order of these elements) can indicate that one element has a better compositional quality than the other element. Additionally or alternatively, the pair can be annotated with information indicating the relative qualities (e.g., which of the two elements has a better compositional quality). In this case, the annotation can be stored as a label of the pair. Generally, an annotation of a pair, whether reflected by the organization of the elements or stored as information in a label, represents ranking scores of the elements.

During the unsupervised training 320, the pairs 326 are input to the evaluation network 310. The loss function 312 is used to update the parameters 314 such that the evaluation network 310 can learn the relevant features to properly detect which element in a pair has a better compositional quality. For example, the objective of the training is to learn a mapping function $f(\ )$ that if $I_i$ is more visually pleasing than $I_j$, then $f(I_i) > f(I_j)$. The parameters 314 are updated to estimate the mapping function $f(\ )$. The loss function 312 is minimized through the training 320 and can be expressed as a hinge loss: $l(I_i, I_j) = \max\{0, 1 + f(I_j) - f(I_i)\}$.

In comparison, the supervised training 330 further refines the parameters 314 given the same loss function 312 and mapping function $f(\ )$. However, annotations are manually generated by a set of users and are available for the supervised training 330. For example, pairs 332 of annotated image crops are input to the evaluation network 310. Each the pairs 332 can be annotated with information that indicates that one of its elements has a better compositional quality than the other element. The annotation can be a label of the pair or can be the organization of the elements in the pair. In an example, a pair includes two different image crops of the same image. In another example, a pair includes an image and an image crop derived from the image. In both examples, an image crop can be generated from an image by using a sparse set of bounding boxes and the annotations of a pair can be added based on user input about compositional qualities of the elements of the pair.

Once both types of training are complete, a ranking layer of the evaluation neural network 310 can be discarded. The mapping function $f(\ )$ is used to map a given image 342 (or, similarly, an image crop) to a compositional score 344.

Figure 4:
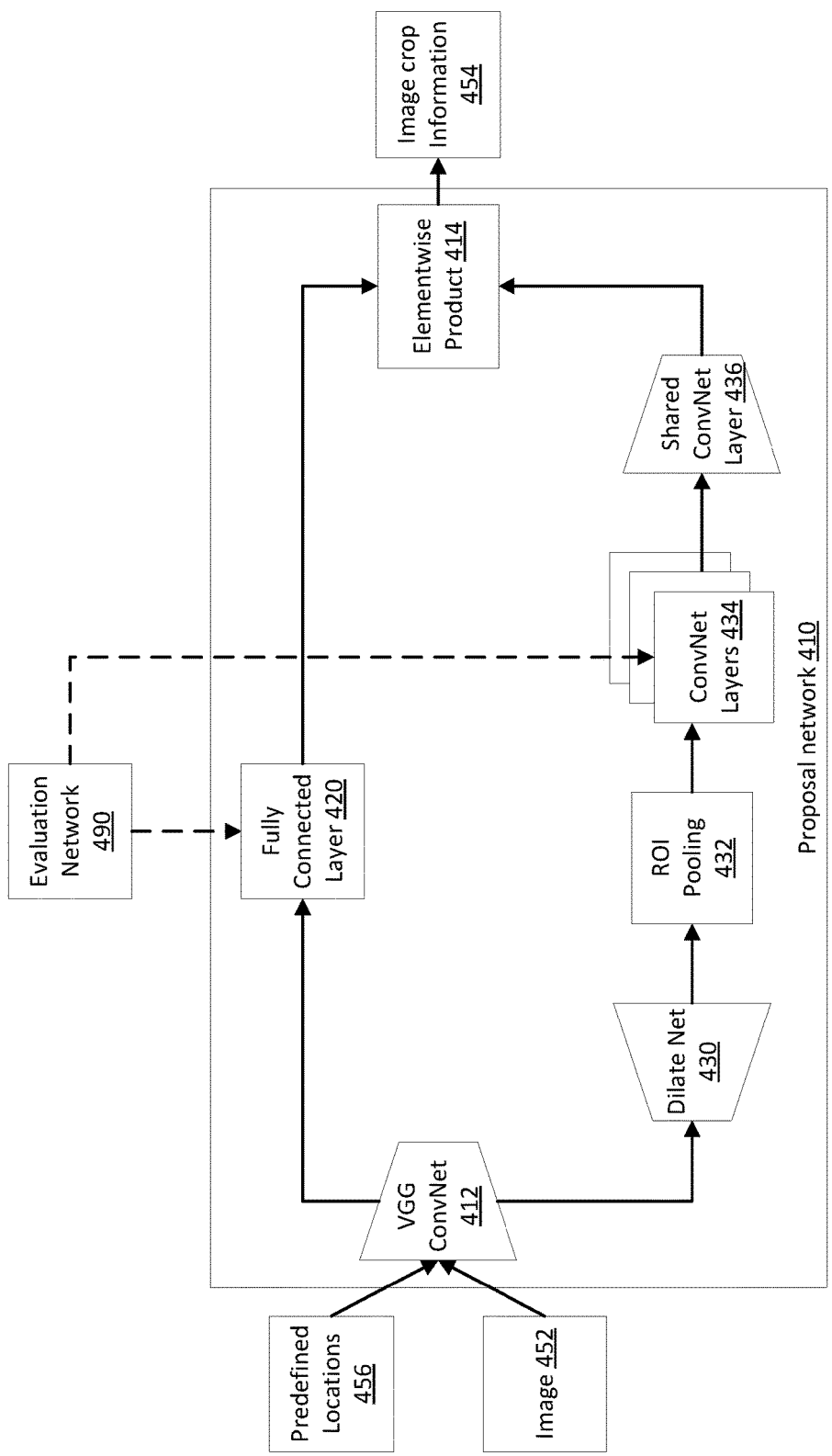
FIG. 4 illustrates an example of training and using a proposal network of a deep-learning system, according to embodiments of the present disclosure.

FIG. 4 illustrates an example of training and using a proposal network 410 of a deep-learning system, according to embodiments of the present disclosure. The training relies on an already-trained evaluation network 490, where the training dataset of the proposal network 410 is annotated based on the evaluation network 490. Using the proposal network includes inputting an image 452 thereto and outputting therefrom image crop information 454. The type of the image crop information 454 can depend on the underlying image application. In an example, the image crop information 454 includes a recommendation for a set of image crops derived from the image 452 and having high compositional qualities. In another example, the image crop information 454 includes a ranking of a set of image crops derived from the image 452. In yet another example, the image crop information 454 includes composition scores of various image crops derived from the image 452. Various approaches are possible to identify each of the image crops to the underlying application. In one example approach, the proposal network 410 (or, more precisely, the deep-learning system) outputs an actual image crop to the image application. In another example approach, the proposal network 410 (or, more precisely, the deep-learning system) outputs, for an image crop, location information (e.g., defined in pixel values or coordinates) of the boundary of the crop area that defines the image crop (e.g., the four corners of the boundary box that corresponds to the crop area). In yet another example approach, the proposal network 410 (or, more precisely, the deep-learning system) outputs, for an image crop, an identifier (e.g., a unique numerical value) of the crop area that defines the image crop (e.g., crop area "123"). In this example, the image application maintains a look-up table that correlates identifiers with crop areas. Accordingly, the image application uses the identifier to determine the crop area and performs a crop operation on the image according to the crop area to generate the image crop. Of course, a video application can be likewise supported. A video stream to the deep-learning system is handled as a stream of images, where each image corresponds to a frame. Crops within an image at each frame or at intervals of frames (e.g., every ten frames) can be scored, recommended, and identified to the video application.

Generally, the proposal network 410 includes a convolutional neural network that assesses the composition scores of various image crops within an image. To do so, predefined locations 456 define an over-complete set of bounding boxes used to generate the image crops from the image. The predefined bounding boxes are densely overlapped over different scales and aspect ratios. For instance, eight-hundred and ninety-five predefined locations are used to define eight-hundred and ninety-five bounding boxes (or, equivalently, image crops) per image. The proposal network 410 runs once on the whole image to generate all the composition scores corresponding to the predefined bounding boxes.

As illustrated in FIG. 4, the proposal network 410 includes multiple sub-networks forming a convolutional neural network. Each of these sub-networks can be a neural network or a portion thereof configured to perform a specific set of operations and trained to do so during the training of the proposal network 410. The sub-networks can be organized in an upper branch, denoted as $G(\ )$, and a lower branch, denoted as $L(\ )$. The upper branch is used to assess the composition score of a bounding box applied to an image (or, equivalently, an image crop) globally given the various features of the image. In comparison, the lower branch is used to assess the composition score of the bounding box (or, equivalently, the image crop) locally given the features of the image that are specific to the bounding box. The two branches can be used in parallel to speed-up the performance of the proposal network 410. The overall composition score of the bounding box can be derived from $S(\ ) = G(\ ) * L(\ )$.

In an example, the image 452 is input to a visual geometry group (VGG) convolutional network (VGG ConvNet) 412 of the proposal network 410. The VGG ConvNet converts the image 452 into features. For instance, a [9×9×1024] feature map is generated from the image 452. The features are provided to the upper and lower branches.

Generally, the upper branch attempts to predict the compositional quality at each location using the holistic image information. To do so, the upper branch includes a fully connected layer 420 that performs a regression of the features to compute the composition score for each bounding box (or, equivalently, image crop) given these features. For example, the fully connected layer 420 is implemented as a fully connected layer of size [1024, 895] which projects each 1024D image feature to an 895D vector corresponding to the scores of the eight-hundred and ninety-five predefined bounding boxes. In this way, the fully connected layer 420 outputs a feature map that includes the various scores of the bounding boxes (or, equivalently, the image crops) given the global features of the image 452. For instance, a [895×1] feature map is generated for the eight-hundred and ninety-five predefined bounding boxes. The feature map is input to an elementwise product module 414 of the proposal network 410.

As illustrated in FIG. 4, during the supervised training of the proposal network 410, annotations of the bounding boxes (or, equivalently, the image crops) are generated based on the evaluation network 490 as described in connection with the previous figures. These annotations are part of the training data used to train the fully connected layer 420.

In comparison, the lower branch attempts to predict the compositional quality at each location using the image information specific to that location. To do so, the lower branch includes a dilate network 430, a region of interest (ROI) pooling module 432, convolutional neural network layers 434, and a shared convolutional neural network layer 436. Like the fully connected layer 420, the layers 434 and 436 can be trained based on the annotations generated by the evaluation network 490.

The dilate network 430 can be a convolutional network that expands the features generated by the VGG ConvNet 412 and provides the expanded features to the ROI pooling module 432. For example, the dilate network 430 interpolates the feature map of [9×9×1024] to an expanded feature map of [32×32×1024]. The expanded feature map allows to localize more precisely the region of interest in the original feature map.

The ROI pooling module 432 receives the expanded features and determines, for each of the predefined locations 456 (or, equivalently, bounding boxes), the applicable features from the expanded features and applies a regression or an averaging function thereto to generate a localized set of features. For example, the ROI pooling module 432 resizes the [32×32×1024] feature map to a fixed size vector of [3×3×128] for each of the bounding boxes. For each of the bounding boxes, the ROI pooling module 432 inputs the localized set of features (e.g., the corresponding [3×3×128] fixed size vector) to the convolutional neural network layers 434.

Each of the convolutional neural network layers 434 receives a localized set of features that correspond to a bounding box (or, equivalently, to an image crop). For example, each of these layers 434 receives one of the [3×3×128] fixed size vectors. In turn, each of the layers 434 generates a composition score for the bounding box (or, equivalently, image crop) given the corresponding localized set of features. The various composition scores generated by the convolutional neural network layers 434 are input to the shared convolutional layer 436.

The shared convolutional layer 436 receives the different composition scores (e.g., eight-hundred ninety-five composition scores) and generates a feature map accordingly (e.g., an [895×1] feature map). The feature map is provided to the elementwise product module 414.

The elementwise product module 414 receives two features maps, one from the upper branch and one from the lower branch and computes a final composition score per bounding box (or, equivalently, per image crop). For example, this module 414 performs an elementwise product of the two feature maps, such that the final composition scores are computed as $S(\ )=G(\ )*L(\ )$.

Training the proposal network 410 directly can be difficult because a large amount of images and annotations for each of locations (e.g., for each of the eight-hundred ninety-five image crops per image). A more efficient approach to train the proposal network 410 is to use the evaluation network 490 as the teacher. For example, given a training image and the predefined locations, the evaluation network 490 is run on each of the predefined locations to generate composition scores as ground truth labels for the proposal network 410. In this way, densely annotated training data is collected at almost no cost.

In the training stage, to alleviate the situation that the imperfect performance of the evaluation network 490 may directly affect the proposal network 490, a dense-pair-wise ranking loss can be used instead of comparing the composition scores computed by the proposal network 410 and the composition scores computed by the evaluation network 490. To do so, the composition scores of the bounding boxes computed by the evaluation network 490 according a mapping function $f(\ )$ are denoted as $[p_1, \ldots p_n]$. Similarly, the composition scores of the bounding boxes computed by the proposal network 410 according the scoring function $S(\ )$ are denoted as $[q_1, \ldots q_n]$. In the example of eight-hundred nighty-five bounding boxes, "n" is equal to eight-hundred nighty-five. The training of the proposal network 410 minimizes the loss function expressed as:

$$l(f, S) = \frac{\sum_{i,j=1 \ldots n, i \neq j}((p_i - p_j) - (q_i - q_j))^2}{n(n-1)/2}.$$

Figure 5:
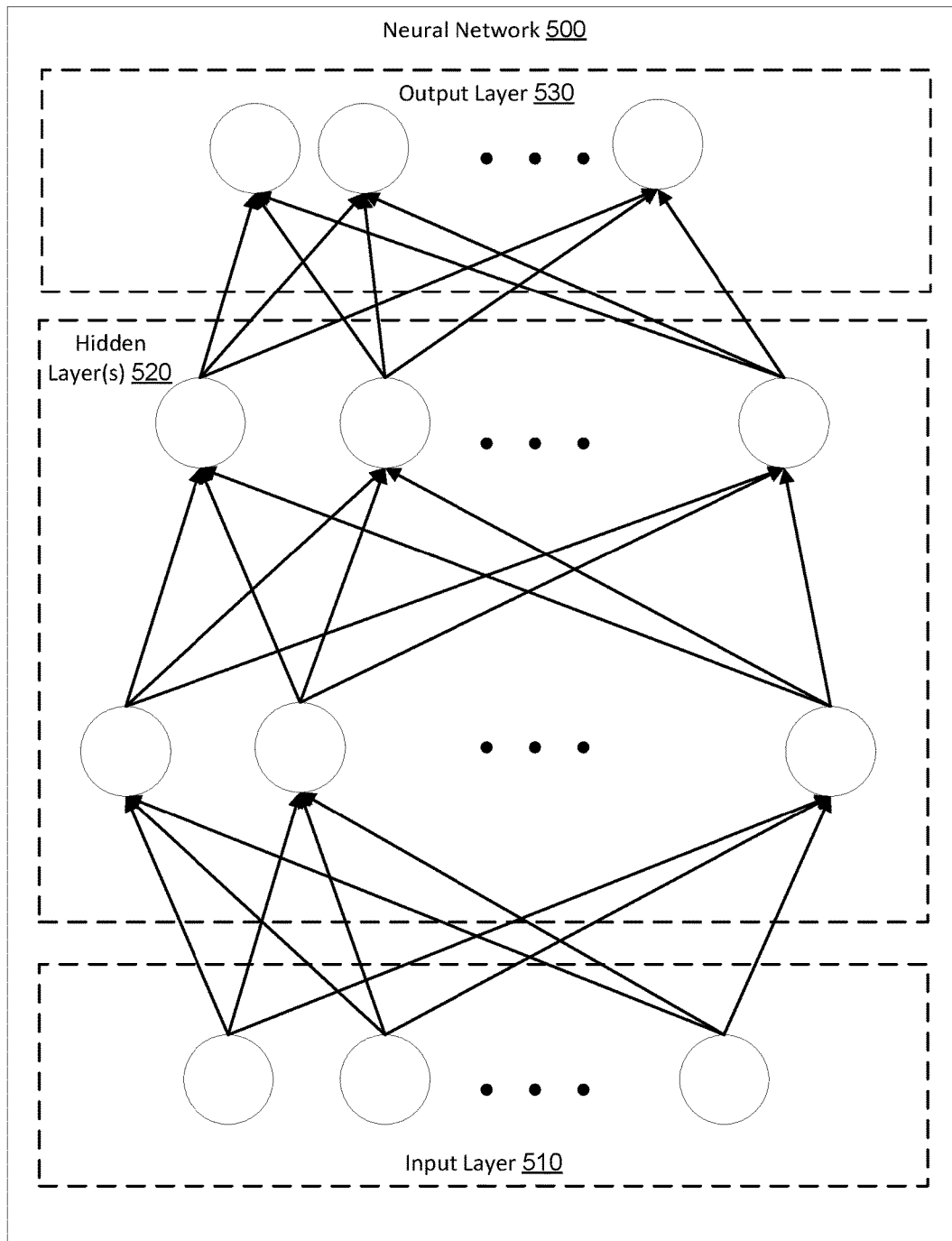
FIG. 5 illustrates an example of a neural network, according to embodiments of the present disclosure.

FIG. 5 illustrates an example of a neural network 500, according to embodiments of the present disclosure. Some or all of the components of this network 500 can be implemented by a deep-learning system as part of an evaluation network and/or a proposal network.

Generally, the neural network 500 represents a network of interconnected nodes, such as an artificial neural network, where knowledge about the nodes is shared between the nodes. Each node represents a piece of information. Knowledge can be exchanged through node-to-node interconnections. Input to the neural network 500 activates a set of nodes. In turn, this set of nodes activates other nodes, thereby propagating knowledge about the input. This activation process is repeated across other nodes until an output node is selected.

As illustrated, the neural network 500 includes a hierarchy of layers representing a hierarchy of nodes. At the lowest hierarchy level, an input layer 510 exists. The input layer 510 includes a set of nodes that are referred to herein as input nodes. Each of these input nodes is mapped to a particular image feature. At the highest hierarch level, an output layer 530 exists. The output layer 530 is mapped to a particular compositional quality assessment. A hidden layer 520 exists between the input layer 510 and the output layer 530. The hidden layer 520 includes "N" number of hidden layers, where "N" is an integer greater than or equal to one. In turn, each of the hidden layers also includes a set of nodes that are referred to herein as hidden nodes.

At the lowest level of the hidden layer 520, hidden nodes of that layer are interconnected to the input nodes. At the highest level of the hidden layer 520, hidden nodes of that layer are connected to the output nodes. If multiple hidden layers exist, the input nodes are interconnected to hidden nodes of the lowest hidden layer. In turn, these hidden nodes are interconnected to the hidden nodes of the next hidden layer and so on and so forth.

An interconnection represents a piece of information learned about the two interconnected nodes. The interconnection has a numeric weight that can be tuned (e.g., based on a training dataset), rendering the neural network 500 adaptive to inputs and capable of learning.

Generally, the hidden layer 520 allows knowledge about the input nodes of the input layer 510 to be shared among the nodes of the output layer 530. To do so, a transformation $f$ is applied to the input nodes through the hidden layer 520. In an example, the transformation $f$ is non-linear. Different non-linear transformations $f$ are possible. In an example, a particular non-linear transformations $f$ is selected based on cross-validation. For example, given known example pairs (x, y), where x∈X and y∈Y, a function $f: X \rightarrow Y$ is selected when such a function results in the best matches.

The neural network 500 also uses a loss function l to find an optimal solution. The optimal solution represents the situation where no solution has a cost less than the cost of the optimal solution. A backpropagation algorithm that uses gradient descent to minimize the loss function l is used to train the neural network 500.

Figure 6:
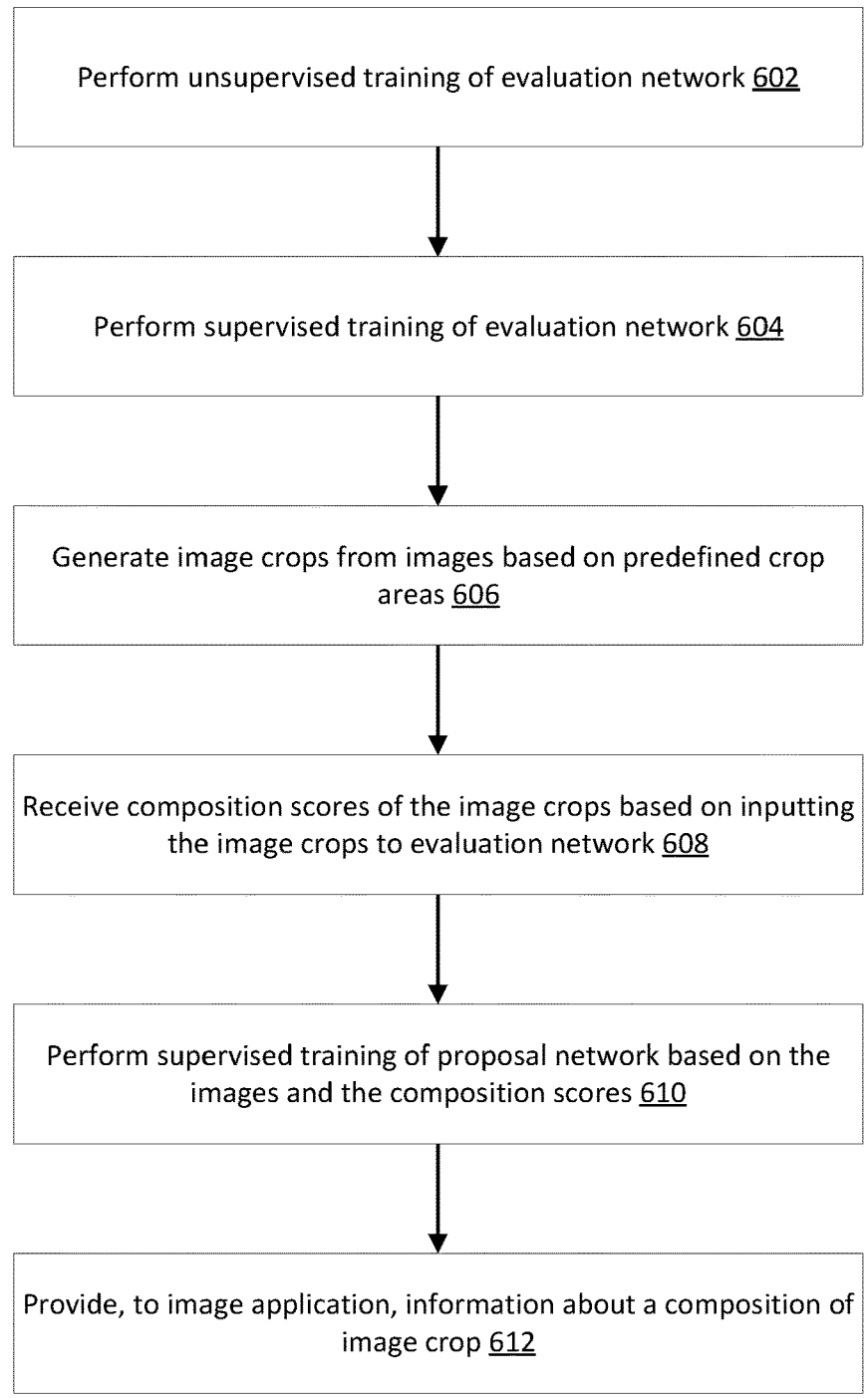
FIG. 6 illustrates an example of a flow for evaluating an image composition, according to embodiments of the present disclosure.
Figure 7:
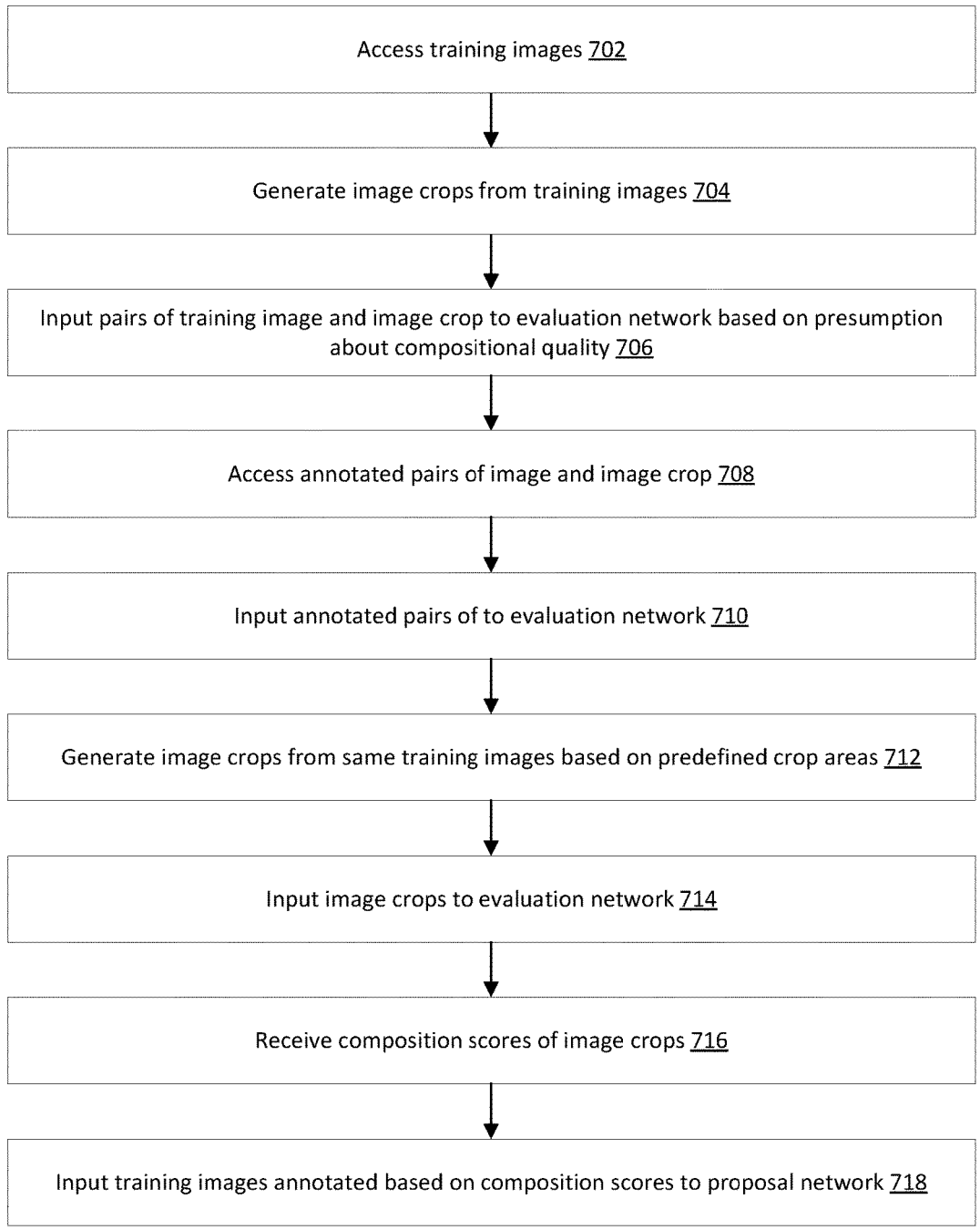
FIG. 7 illustrates an example of a flow for training an evaluation network and a proposal network to evaluate compositions of an image and image crops generated from the image, according to embodiments of the present disclosure.
Figure 8:
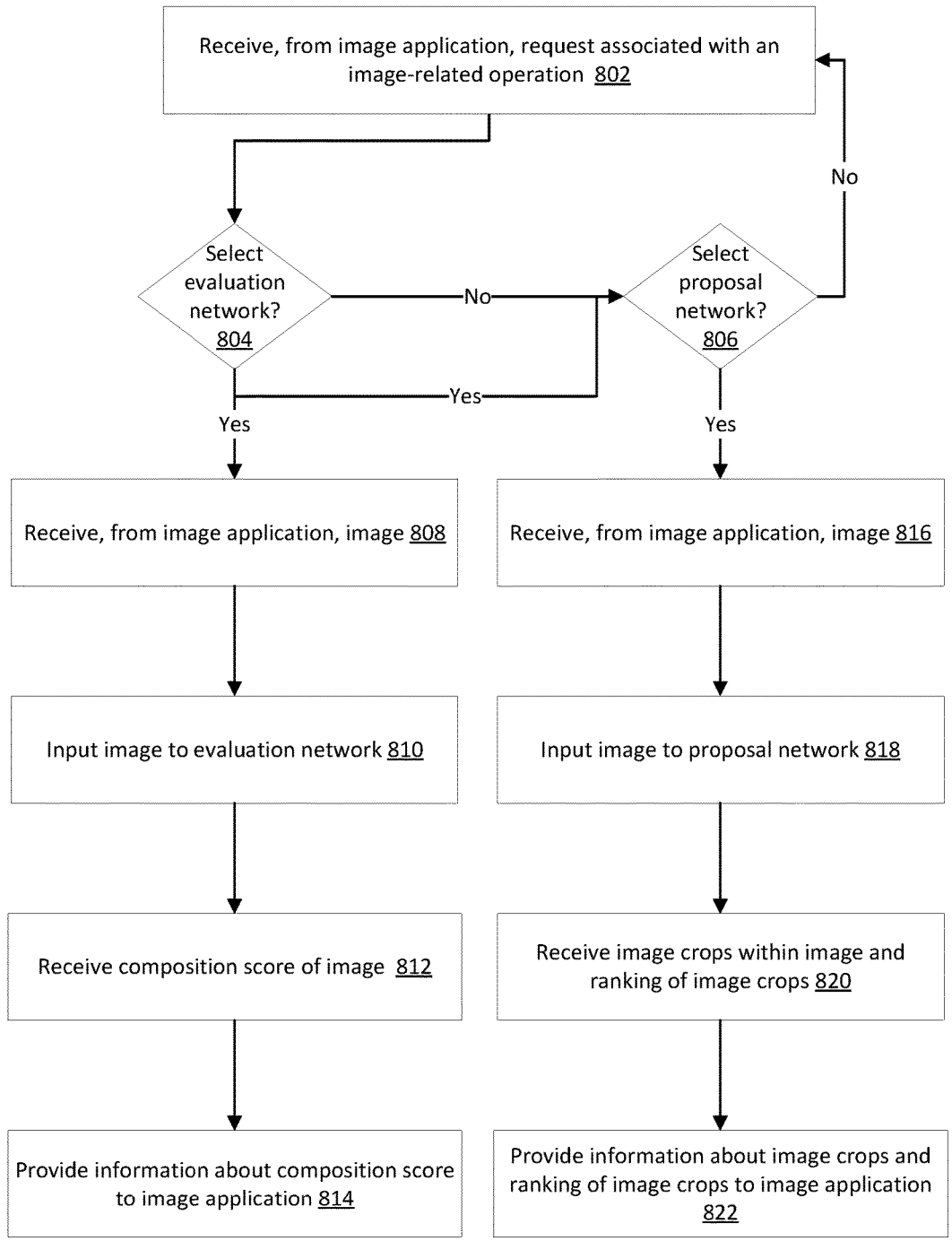
FIG. 8 illustrates an example of a flow for providing an image application that uses an evaluation network and a composition network, according to embodiments of the present disclosure.

FIGS. 6-8 illustrate examples of flows for evaluating the composition of images or image crops and using such evaluations. A computer system may be configured to perform the illustrative flows. For example, the computer system can include the server 102 and/or the client 130 of FIG. 1, in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered.

FIG. 6 illustrates an example of a flow for evaluating an image composition, according to embodiments of the present disclosure. The example flow starts at operation 602, where the computer system performs unsupervised training of an evaluation network (e.g., a first neural network). In an example, the unsupervised training is based on unannotated image crops and includes updating parameters of the evaluation network associated with generating a composition score of an image crop within an image.

At operation 604, the computer system performs supervised training of the evaluation network. In an example, the supervised training is performed upon completion of the unsupervised training and is based on annotated image crops. The supervised training further updates the parameters of the evaluation network.

At operation 606, the computer system generates image crops from images based on predefined crop areas. In an example, each crop area is defined by a boundary box that corresponds to a predefined image location. Eight-hundred ninety-five densely overlapped over different image scales and aspect ratios are defined. Accordingly, the computer system generates eight-hundred ninety-five from each image.

At operation 608, the computer system receives composition scores of the image crops based on inputting the image crops to the evaluation network upon completion of the supervised training of the evaluation network. In an example, each of the image crops is input to the fully trained evaluation network. Outputs of this network are received and each includes a composition score of a corresponding image crop. The computer system generates annotations based on the composition scores.

At operation 610, the computer system performs supervised training of a proposal network (e.g., a second neural network) based on the images and the composition scores. In an example, the images and the annotations are input to the proposal network. The supervised training includes updating parameters of the proposal network associated with evaluating compositions of the predefined crop areas within the image.

At operation 612, the computer system provides, to an image application, information about a composition of the image crop within the image based on at least one of an output from the evaluation network or an output from the proposal network. In an example, the type of information depends on the image application. For instance, if the computer system receives a request from the image application to evaluate the composition of the image, the computer system inputs this image to the fully trained evaluation network. In response, the computer system receives a composition score of the image and returns this score to the image application. In another illustration, if the request is to recommend one or more image crops, the computer system inputs the image to the fully trained proposal network. In response, the computer system receives a composition score per each of the eight-hundred ninety-five possible image crops of the image or a ranking of such image crops. The computer system returns a recommendation that identifies a subset of the image crops to the image application (e.g., the ten image crops that have the best composition scores).

FIG. 7 illustrates an example of a more detailed flow for training the evaluation network and proposal network to evaluate compositions of an image and image crops generated from the image, according to embodiments of the present disclosure. The operations of this flow can be implemented as sub-operations of the flow of FIG. 6.

The example flow of FIG. 7 starts at operation 702, where the computer system accesses training images. In an example, the training images are unannotated and cover a diverse set of subject matter. Such images may be available from local memory of the computer system or from a remote network storage location.

At operation 704, the computer system generates image crops from the training images. In an example, the image crops are generated by randomly cropping the training images and presumed to have a lower compositional quality relative to the training images. In another example, large, medium, and small crops are generated by selectively cropping the training images. Large image crops are presumed to have a higher compositional quality relative to the training images, whereas the compositional quality of the medium and small image crops is presumed to be relatively lower.

At operation 706, the computer system inputs pairs to the evaluation network. Each pair includes a training image and an image crop derived from the training image. The pair is annotated based on the presumptions of the compositional qualities. The annotations can be stored as a label or can be reflected by using a particular order of the elements of a pair (e.g., where the order indicates that the first element has a better compositional quality than the second element). Generally, the annotation of each pair indicates a ranking of the compositional quality of the elements of the pair. Accordingly, the evaluation network is trained in an unsupervised mode by updating its parameters to minimize its loss function through a backpropagation algorithm.

At operation 708, the computer system accesses annotated pairs, where each pair includes a training image and an image crop. Alternatively or additionally, some or all of the pairs each includes two different image crops from the same image. The annotation of a pair is also stored as a label or reflected in the particular order of the elements in the pair. The annotation also indicates a ranking of the compositional quality of the elements of the pair. These annotations can be stored in the local memory of the computer system or on the remote network storage location based on user input that ranks the compositional quality of the elements in each pair.

At operation 710, the computer system inputs the annotated pairs to the evaluation network. Accordingly, the evaluation network is additionally trained in a supervised mode by further updating its parameters to minimize its loss function through the backpropagation algorithm.

At operation 712, the computer system generates image crops from same training images based on predefined crop areas. These training images are referred to herein as second training images to avoid confusion with the training images used to train the evaluation network. The two sets of training images need not be the same. In an example, the computer system accesses the second training images from local memory or from the remote network storage location. The second training images can cover a diverse set of subject matter. The computer system also accesses a definition of boundary boxes that correspond to image location from, for instance, the local memory. The number, types, shapes, and sizes of the boundary boxes can be predefined. From each second training image, the computer system generates image crops by cropping the second training image according to the boundary boxes. For instance, eight-hundred ninety-five densely overlapped image crops are generated per second training image over different scales and aspect ratios of the image.

At operation 714, the computer system inputs the image crops to the evaluation network. In an example, this input is provided after the evaluation network has been fully trained in the unsupervised and supervised modes as described in connection with operations 702-710.

At operation 716, the computer system receives composition scores of the image crops. In an example, the evaluation network outputs a composition score for each of the image crops that were input at operation 714.

At operation 718, the computer system input the second training images annotated based on the composition scores to the proposal network. In an example, the computer system generates pairs. In an illustration, a pair includes two different image crops that were generated from the same second training image at operation 712. In another illustration, a pair includes two different image crops that were generated from two different second training images, respectively, at operation 712. In yet another illustration, a pair includes one of the second training images as an element and an image crop derived from this second training image as the remaining element. The annotation of the pair uses the composition score of the image crop, in addition of the composition score of the second training image (which can be additionally received at operation 716 by additionally providing the second training image to the evaluation network at operation 714). A pair can be annotated according to the compositional quality of its elements. For example, the composition scores of the two elements are added as a label to the pair. In another example, the relative compositional ranking of the two elements (e.g., element one has a better compositional quality than element two) are added as the label. In yet another example, the order of the two elements in the pair indicates the relative compositional ranking of the two elements. By using the order as the type of annotation, the amount of training data can be reduced. Accordingly, the proposal network is trained in a supervised mode by updating its parameters to minimize its loss function through a backpropagation algorithm. Unlike the supervised training of the evaluation network, here the annotations are automatically generated by using the evaluation network as a teacher of the proposal network.

FIG. 8 illustrates an example of a flow for providing an image application that uses an evaluation network and a composition network, according to embodiments of the present disclosure. The example flow starts at operation 802, where the computer system receives, from an image application, a request associated with an image-related operation. In an example, the image-related operation is provided by the image application to a client. The request may be received based on user input at the client and can indicate whether an evaluation of a composition of an image is desired and/or whether a recommendation of one or more image crops within the image are desired.

At operation 804, the computer system determines whether the evaluation network should be used in support of the image-related operation. In an example, this determination is based on the request. If the request is to evaluate the composition of the image, the evaluation network should be used. In this case, operations 806 and 808 are performed following operation 804. Otherwise, only operation 806 is performed following operation 804.

At operation 806, the computer system determines whether the proposal network should be used in support of the image-related operation. In an example, this determination is also based on the request. If the request is for a recommendation of one or more image crops, the proposal network should be used. In this case, operation 816 is performed following operation 806. Otherwise, operation 802 is performed again as indicated with the loop in FIG. 8, such that the flow is restarted when a next request is received.

At operation 808, the computer system receives, from the image application, the image (or an identifier to network storage location that stores the image, such as the relevant uniform resource locator (URL)). This operation follows the determination that the evaluation network should be used.

At operation 810, the computer system inputs the image to the evaluation network. At operation 812, the system receives a composition score of the image based on the input at operation 810.

At operation 814, the computer system provides information about the composition score to the image application. In an example, the information includes the composition score. In another example, the information includes a qualitative assessment given the composition score. For instance, the computer system can access or maintain a table that maps ranges of composition scores to quality bands (e.g., good, medium, and poor). The table is looked up to determine the applicable quality band given the composition score. The information includes the determined quality band.

Although the flow illustrates the use of an image in connection with the evaluation network, the evaluation network can also be used to evaluate image crops that a user composes. For instance, operations 808-814 can be performed to similarly evaluate an image crop, where this image crop is received from the image application based on user input at the client.

At operation 816, the computer system receives, from the image application, the image (or an identifier to network storage location that stores the image, such as the relevant uniform resource locator (URL)). This operation follows the determination that the proposal network should be used.

At operation 818, the computer system inputs the image to the proposal network. At operation 820, the system receives image crops generated from the image and ranking of the image crops from the proposal network in response to the input of the image at operation 818. In an example, the proposal network generates the image crops by cropping the image in different ways that correspond to predefined boundary boxes. The proposal network evaluates each image crop by generating a respective composition score and ranks the various image crops given their compositions scores. The proposal network returns a recommendation that identifies a subset of the image crops given their ranking (e.g., the top ten image crops).

At operation 822, the computer system provides information about the image crops and the ranking of the image crops to the image application. In an example, the information includes the image crops and their composition scores. In another example, the information includes the subset of the image crops and the associated composition scores. In yet another example, the computer system returns one or more groups of the image crops, where each group is associated with a quality band and groups the image crops mapped to that quality band.

In lab testing, the speed performance was assessed for the evaluation network and proposal network of the embodiments of the present disclosure. The proposal network has a frame rate of around five frames per second on a graphics processing unit (GPU) machine. Eight-hundred ninety-five images within an image crop can be assessed in less than 0.2 seconds. The evaluation network is slower by up to an order of magnitude. Further, the lab testing included training a first instance of the proposal network by using the evaluation network as the teacher according to the embodiments of the present disclosure and a second instance of the proposal network by using the user-based annotations that were used to train the evaluation network. The lab testing shows that the first instance significantly outperforms the second instance in the quantitative assessment of image crop compositions. Further, the performance of the deep-learning system of the embodiments of the present disclosure was compared to the performance of a commonly used rule-based system. Three performance metrics were measured and analyzed: normalized discounted cumulative gain, mean goodness, and mean badness. The deep-learning system consistently outperformed the rule-based system.

Figure 9:
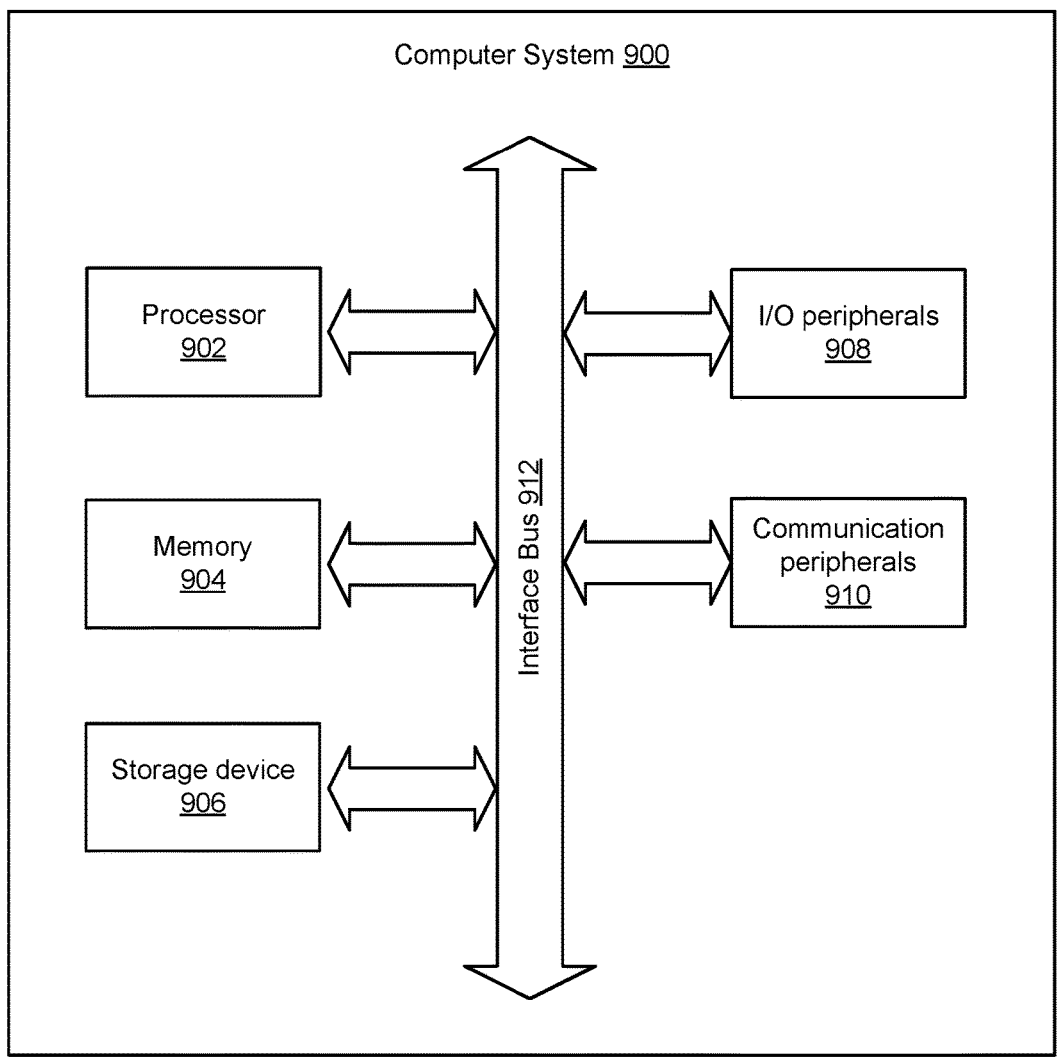
FIG. 9 illustrates examples of components of a computer system, according to certain embodiments.

FIG. 9 illustrates examples of components of a computer system 900, according to certain embodiments. The computer system 900 may be a single computer or can represent a distributed computing system.

The computer system 900 includes at least a processor 902, a memory 904, a storage device 906, input/output peripherals (I/O) 908, communication peripherals 910, and an interface bus 912. The interface bus 912 is configured to communicate, transmit, and transfer data, controls, and commands among the various components of the computer system 900. The memory 904 and the storage device 906 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 904 and the storage device 906 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computing system of, for example, a cloud network or a data center. The I/O peripherals 908 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 908 are connected to the processor 902 through any of the ports coupled to the interface bus 912. The communication peripherals 910 are configured to facilitate communication between the computer system 900 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method, the method comprising:
    performing, by a computer system, an unsupervised training of a first neural network based on unannotated image crops from a first set of training images, the unsupervised training comprising updating parameters of the first neural network associated with generating a composition score of one or more of the unannotated image crops;
    performing, by the computer system upon completion of the unsupervised training, a first supervised training of the first neural network based on a set of annotated image crops from the first set of training images further by updating the parameters of the first neural network;
    generating, by the computer system, a set of additional image crops from a second set of training images, wherein the set of additional image crops is generated based on predefined crop areas;
    receiving, by the computer system, from the first neural network, and upon completion of the first supervised training, a set of composition scores corresponding to the set of additional image crops, the set of composition scores based on inputting the set of additional image crops to the first neural network;
    performing, by the computer system, a second supervised training of a second neural network based on the second set of training images and the set of composition scores, the second supervised training comprising updating parameters of the second neural network associated with evaluating compositions of the predefined crop areas; and
    providing, by the computer system and to an image application, information about a composition of an input image crop within an input image, the composition based on at least one of: an output from the first neural network or an output from the second neural network.

2. The computer-implemented method of claim 1, wherein the first neural network is a convolutional neural network that receives the input image crop, learns features of the input image crop based on the unsupervised training and the first supervised training, and outputs a composition score based on the features.

3. The computer-implemented method of claim 1, wherein the unannotated image crops are generated based on applying random bounding boxes to the first set of training images, further comprising inputting, by the computer system to the first neural network in the unsupervised training, a pair of a training image from the first set of training images and an unannotated image crop of the training image, wherein the unannotated image crop is generated based on applying a random bounding box to the training image.

4. The computer-implemented method of claim 1, wherein performing the first supervised training of the first neural network comprises:
    inputting, to the first neural network, a pair of a first image crop and a second image crop annotated with information indicating that the first image crop has a better composition than the second image crop.

5. The computer-implemented method of claim 4, wherein the first supervised training of the first neural network minimizes a loss function based on the pair of the first image crop and the second image crop.

6. The computer-implemented method of claim 1, wherein a number of unannotated image crops used for the unsupervised training of the first neural network is at least an order of magnitude larger than a number of annotated image crops used in the first supervised training of the first neural network.

7. The computer-implemented method of claim 1, wherein performing the second supervised training of the second neural network comprises:
generating a first image crop from a first image, wherein the first image crop corresponds to a first predefined crop area within the first image;
generating a second image crop from the first image, wherein the second image crop corresponds to a second predefined crop area within the first image;
receiving, from the first neural network, a first composition score and a second composition score for the first image crop and the second image crop, respectively;
generating information indicating a relative composition quality of the first image crop and the second image crop, the relative composition quality based on the first composition score and the second composition score; and
inputting, to the second neural network, a pair of the first image crop and the second image crop annotated with the information indicating the relative composition quality.

8. The computer-implemented method of claim 7, wherein the second supervised training of the second neural network comprises:
inputting, by the computer system to the second neural network, the first image crop, the second image crop;
receiving, by the computer system from the second neural network, a third composition score for the first image crop and a fourth composition score for the second image crop;
minimizing, by the computer system, a loss function based on the first composition score, the second composition score, the third composition score, and the fourth composition score.

9. The computer-implemented method of claim 1, wherein providing the information comprises:
selecting between at least one of the first neural network and the second neural network to generate the information;
based on selecting the first neural network:
inputting the input image crop to the first neural network, and
receiving the set of composition scores from the first neural network without passing data between the first neural network and the second neural network; and
based on selecting the second neural network:
inputting the input image to the second neural network, and
receiving a recommendation that identifies the input image crop from the second neural network without passing the data between the first neural network and the second neural network.

10. A system associated with cropping images, the system comprising:
means for performing an unsupervised training of a first neural network based on unannotated image crops from a first set of training images, the first neural network associated with generating a composition score of one or more of the unannotated image crops;
means for performing, upon completion of the unsupervised training, a first supervised training of the first neural network based on a set of annotated image crops;
means for receiving, upon completion of the first supervised training and from the first neural network, a set of composition scores corresponding to additional image crops generated from a second set of training images, the set of composition scores received based on inputting the additional image crops to the first neural network; and
means for performing a second supervised training of a second neural network based on the second set of training images and the set of composition scores, the second neural network associated with evaluating compositions of predefined crop areas.

11. The system of claim 10, wherein training of the first neural network and the second neural network comprises updating parameters of the first neural network and the second neural network, the system further comprising means for providing, to an image application, information about a composition of an input image crop within an image, the information based on at least one of: an output from the first neural network or an output from the second neural network.

12. The system of claim 10, wherein the second neural network is a convolutional neural network that, learns features corresponding to one of the predefined crop areas and generates the composition score based on the features.

13. The system of claim 10, wherein the second neural network comprises a first branch that includes a first convolutional neural network, wherein the first convolutional neural network is associated with outputting, based on learned features, the composition score, wherein the composition score corresponds to one of the predefined crop areas.

14. The system of claim 13, wherein the second neural network further comprises a second branch that includes a second convolutional neural network, wherein the second convolutional neural network is associated with outputting the composition score based on features specific to the one of the predefined crop areas.

15. The system of claim 14, wherein the second neural network outputs a final composition score for a particular image crop corresponding to the one of the predefined crop areas, wherein the final composition score is outputted based on (i) generating, in parallel, a first composition score for the particular image crop based on the first branch and second composition score for the particular image crop based on the second branch, and on (ii) combining the first composition score and the second composition score.

16. The system of claim 10, wherein the second supervised training of the second neural network comprises:
receiving, from the first neural network, a first composition score and a second composition score for a first image crop and a second image crop, respectively, wherein the first image crop and the second image crop correspond to two different predefined crop areas within a same image; and
inputting, to the second neural network, a pair that comprises the first image crop and the second image crop with information about the first composition score and the second composition score.

17. A non-transitory computer-readable storage medium storing instructions that, upon execution on a system, cause the system to perform operations comprising:
performing an unsupervised training of a first neural network based on unannotated image crops from a first set of training images, the first neural network associated with generating a composition score of one or more of the unannotated image crops;

performing, upon completion of the unsupervised training, a first supervised training of the first neural network based on a set of annotated image crops;

receiving, from the first neural network and upon completion of the first supervised training, a set of composition scores corresponding to additional image crops generated from a second set of training images, the set of composition scores received based on inputting the additional image crops to the first neural network; and performing second supervised training of a second neural network based on the second set of training images and the set of composition scores, the second neural network associated with evaluating compositions of predefined crop areas.

18. The non-transitory computer-readable storage medium of claim 17, wherein the predefined crop areas overlap over different scales and aspect ratios.

19. The non-transitory computer-readable storage medium of claim 17, wherein the operations further comprise:

inputting an input image to the second neural network; and receiving, from the second neural network, a ranking for a particular image crop of the input image, the particular image crop corresponding to one of the predefined crop areas, the ranking based on a composition score of the particular image crop generated by the second neural network based on evaluating compositions of the predefined crop areas within the input image.

20. The non-transitory computer-readable storage medium of claim 17, wherein the operations further comprise:

inputting an input image crop to the first neural network and an input image to the second neural network; and determining that a particular image crop corresponding to one of the predefined crop areas has a better composition than the input image crop, the determining based on a composition score of the set of composition scores generated by the first neural network and based on an additional composition score generated by the second neural network for the particular image crop.

* * * * *